US012209738B1

(12) United States Patent
Liu

(10) Patent No.: US 12,209,738 B1
(45) Date of Patent: Jan. 28, 2025

(54) TELESCOPIC ROD FOR A DESK LAMP

(71) Applicant: Jing Liu, Hebei Province (CN)

(72) Inventor: Jing Liu, Hebei Province (CN)

( * ) Notice: Subject to any disclaimer, the term of this patent is extended or adjusted under 35 U.S.C. 154(b) by 0 days.

(21) Appl. No.: 18/437,176

(22) Filed: Feb. 8, 2024

(51) Int. Cl.
*F21V 21/22* (2006.01)
*A47B 97/00* (2006.01)

(52) U.S. Cl.
CPC .............. *F21V 21/22* (2013.01); *A47B 97/00* (2013.01); *A47B 2200/0084* (2013.01); *A47B 2220/0077* (2013.01)

(58) Field of Classification Search
CPC .............. F21V 21/22; F16M 2200/027; F16M 2200/025; E04H 12/182; A47B 9/20
See application file for complete search history.

(56) References Cited

U.S. PATENT DOCUMENTS 1,919,114 A * 7/1933 Ley .......................... F21V 21/22 403/112
2,642,246 A * 6/1953 Larry ...................... F21V 21/22 248/188.5
2,902,592 A * 9/1959 Cole ....................... F21V 21/22 362/277
3,694,647 A * 9/1972 Chapman, Jr. .......... F21V 21/14 362/411
3,955,079 A * 5/1976 Chapman ................ F21V 21/22 362/413
4,113,222 A * 9/1978 Frinzel .................. F16M 11/28 248/412
4,390,933 A * 6/1983 Warshawsky ........... F21V 21/22 362/450
4,449,171 A * 5/1984 Warshawsky ........... F21V 21/22 362/450
4,874,991 A * 10/1989 Ruskin .................... F21V 21/22 315/362
5,065,297 A * 11/1991 Santambrogio ......... F21V 21/22 362/427
5,155,667 A * 10/1992 Ho .......................... F21V 21/22 362/418
5,400,995 A * 3/1995 Boyd ................... F16M 11/046 248/407
5,800,053 A * 9/1998 Shen ....................... F21V 21/22 362/418
2023/0366527 A1 11/2023 He

* cited by examiner

*Primary Examiner* — Ismael Negron
(74) *Attorney, Agent, or Firm* — Ying-Ting Chen; Law Office of Michael Chen

(57) ABSTRACT

A telescopic rod includes a moving rod having a longitudinal guide groove along its outer surface, first and second friction pads at a first end, and a threaded ring at a second opposite end. A positioning rod includes at a top end a limiting with a limiting cylinder with a limiting protrusion projecting from an inside surface configured to be received in the guide groove when the moving rod is slideably installed inside the positioning rod. First and second openings are provided in the first end of the moving rod for receiving first and second installation blocks of the friction pads. The top end of the positioning rod includes two positioning holes configured to receive two clamping block of the limiting cylinder. A threaded installation ring is provided at a bottom end of the positioning rod.

7 Claims, 7 Drawing Sheets

TELESCOPIC ROD FOR A DESK LAMP

FIELD OF THE INVENTION

The present invention relates to desk lamps, specifically to a desk lamp telescopic rod.

BACKGROUND OF THE INVENTION

With the advancement of technology, the appearance and shape of desk lamps are constantly developing, which are small and exquisite, easy to carry. Their main function is lighting, making it easy to read, learn, work, etc, but along with rapid development, the table lamps have the value beyond its own and even become an artwork. With the upgrading of people's usage, floor standing desk lamps have gradually emerged, which are directly placed on the ground for lighting through the lamp rod for easy illumination.

The Chinese patent with publication No. CN210345250U discloses a multi-purpose smart desk lamp that is easy to use, comprising the base and the fixing base, the right side of the fixing base is provided with the groove, and the first clamping block is slidably connected between the top and bottom of the inner surface of the groove, the right side of the first clamping block is fixedly connected to the connecting rod, and the right side of the inner surface of the groove is fixedly connected to the sleeve on the surface of the connecting rod.

The above-mentioned patent provides a handle to connect the second clamping block with the second clamping slot, ensuring that the telescopic rod is fixed to the fixing rod. However, due to the certain distance between the second clamping slot, the height of the telescopic rod cannot be adjusted freely and the operation is very inconvenient, furthermore, the telescopic rod on the existing desk lamp may become loosen over time, causing it rotate freely, thereby affecting the normal use of the desk lamp.

Therefore, the present invention provides a desk lamp telescopic rod to solve the above-mentioned problems.

SUMMARY OF THE DISCLOSURE

In order to solve the above problems, the present invention provides a desk lamp telescopic rod, which effectively solves the problem that the height of the desk lamp telescopic rod of prior art cannot be adjusted freely, the operation is inconvenient and the telescopic rod will become loosen over time, thereby affecting the normal use of the desk lamp.

To achieve the above purpose, the present invention provides the following technical solutions:

A desk lamp telescopic rod, comprises the moving rod and the positioning rod, wherein the bottom of the moving rod is slidably installed inside the positioning rod, the top of the positioning rod is provided with the limiting cylinder, the outer of the moving rod is provided with the limiting guide groove, the inner side of the limiting cylinder is fixedly installed with the limiting protrusion located inside the limiting guide groove, the lower end of the moving rod is provided with the first friction pad and the second friction pad, and the upper end of the positioning rod is provide with two positioning holes, and the outer side of the limiting cylinder is fixedly installed with the clamping block positioned inside each positioning hole.

Preferably, the limiting cylinder is fixedly installed at the top of the positioning rod, and the stop ring is fixedly installed at the top of the limiting cylinder, the outer diameter of the stop ring is the same as that of the positioning rod.

Preferably, the lower end of the moving rod is provided with the first positioning opening and the second positioning opening, the first friction pad is fixedly installed with the first installation block located inside the first positioning opening, and the second friction pad is fixedly installed with the second installation block located inside the second positioning opening.

Preferably, the first block ring is fixedly installed at the bottom of the first friction pad, and the second block ring is fixedly installed at the bottom of the second friction pad, the inner diameters of the first block ring and the second block ring are the same as those of the moving rod.

Preferably, the bottom of the positioning rod is internally threaded with the installation ring.

Preferably, the upper end of the moving rod is in the curved structure, and the upper end of the moving rod is threaded with the lamp ring.

Preferably, the first friction pad and the second friction pad are in the arc-shaped structure.

The beneficial effects of the present invention are:

Due to the significant friction between the first friction pad and second friction pad, they could be stopped at any position on the positioning rod, making operation more convenient. As the limitation function of limiting protrusion on the limiting guide groove, the moving rod could only slide up and down without rotating freely, preventing the lamp from deviating from external forces and avoiding the cases that affecting normal use.

DETAILED DESCRIPTION OF THE PREFERRED EMBODIMENTS

Figure 1:
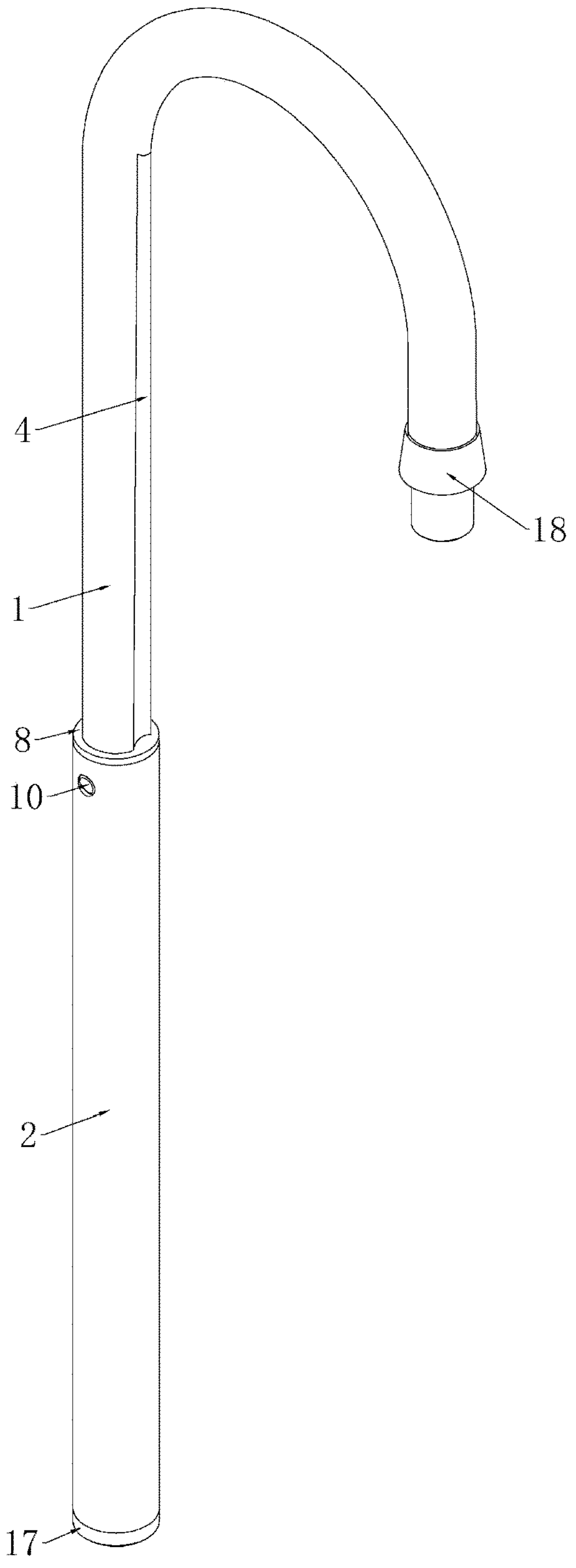
FIG. 1 is the perspective view of the present invention.

Other features, objects and advantages of the present invention will be more clearly and completely by the detailed description of the non-limiting embodiments with reference to the attached drawings. Obviously, the described embodiments are only part of the embodiments of the present invention, but not all of them. Based on the embodiments of the present invention, all other embodiments obtained by ordinary technicians in the field without creative labor are within the scope of the present invention.

As shown in FIGS. 1-7, a desk lamp telescopic rod comprises the moving rod 1 and a positioning rod 2, the interior of the moving rod 1 and positioning rod 2 is in cavity structure, and the top of the positioning rod 2 is provided with the limiting cylinder 3, the limiting cylinder 3 is in the structure from bottom-to-top, and the lower end of the moving rod 1 slides up and down inside the limiting cylinder 3, the outer of the moving rod 1 is provided with the limiting guide groove 4, the limiting guide groove 4 is vertically arranged along the outer side of the moving rod 1, the inner side of the limiting cylinder 3 is fixedly installed with the limiting protrusion 5, and the limiting protrusion 5 is located inside the limiting guide groove 4, the limiting guide groove 4 could slide up and down against the limiting protrusion 5, while also preventing the moving rod 1 from freely rotating, The lower end of the moving rod 1 is provided with the first friction pad 6 and the second friction pad 7, the first friction pad 6 and the second friction pad 7 are located on the same plane and both are below the limiting cylinder 3, the limiting cylinder 3 could block the first friction pad 6 and the second friction pad 7 to prevent them separated from the positioning rod 2, the upper end of the positioning rod 2 is provided with two positioning holes 9, which are symmetrically arranged, the outer side of the limiting cylinder 3 is fixedly installed with two clamping blocks 10, which are symmetrically arranged, the clamping blocks 10 are made of elastic material and could be compressed and automatically reset.

Figure 6:
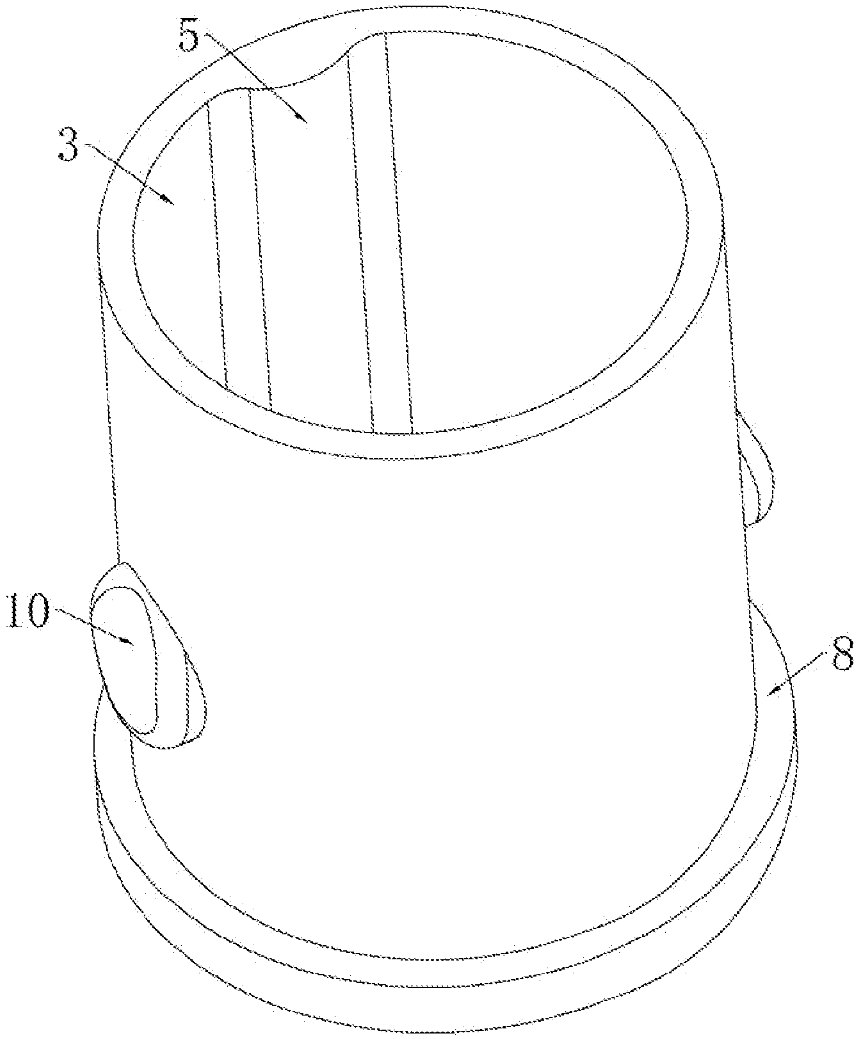
FIG. 6 is the schematic view of the limiting cylinder.
Figure 7:
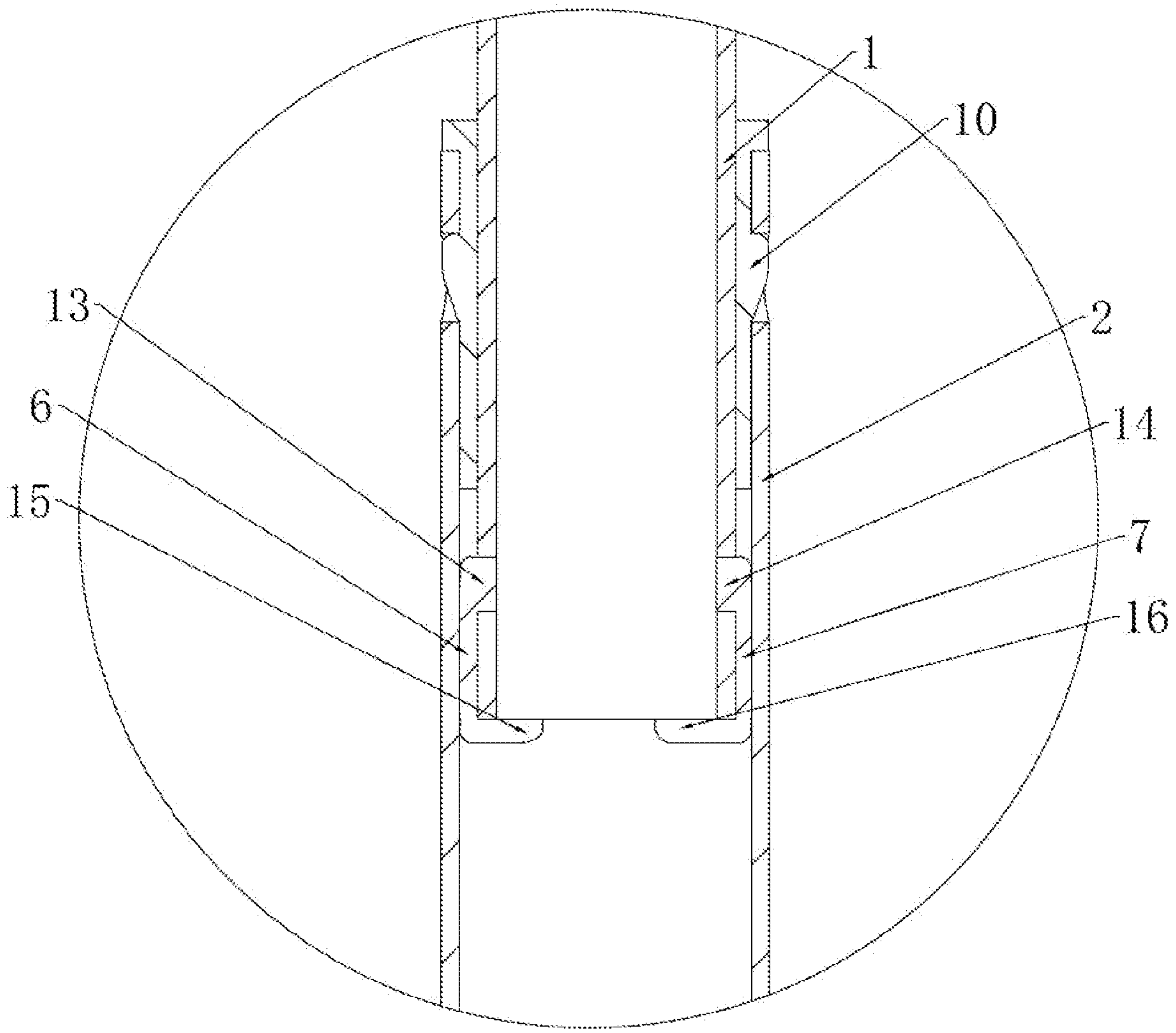
FIG. 7 is the partial sectional schematic view of the moving rod.

As shown in FIG. 6, the limiting cylinder 3 is fixedly installed inside the top end of the positioning rod 2, and the stop ring 8 is fixedly installed at the top end of the limiting cylinder 3, the outer diameter of the stop ring 8 is the same as that of the positioning rod 2, and the lower end surface of the stop ring 8 is in contact with the top end surface of the positioning rod 2.

Figure 4:
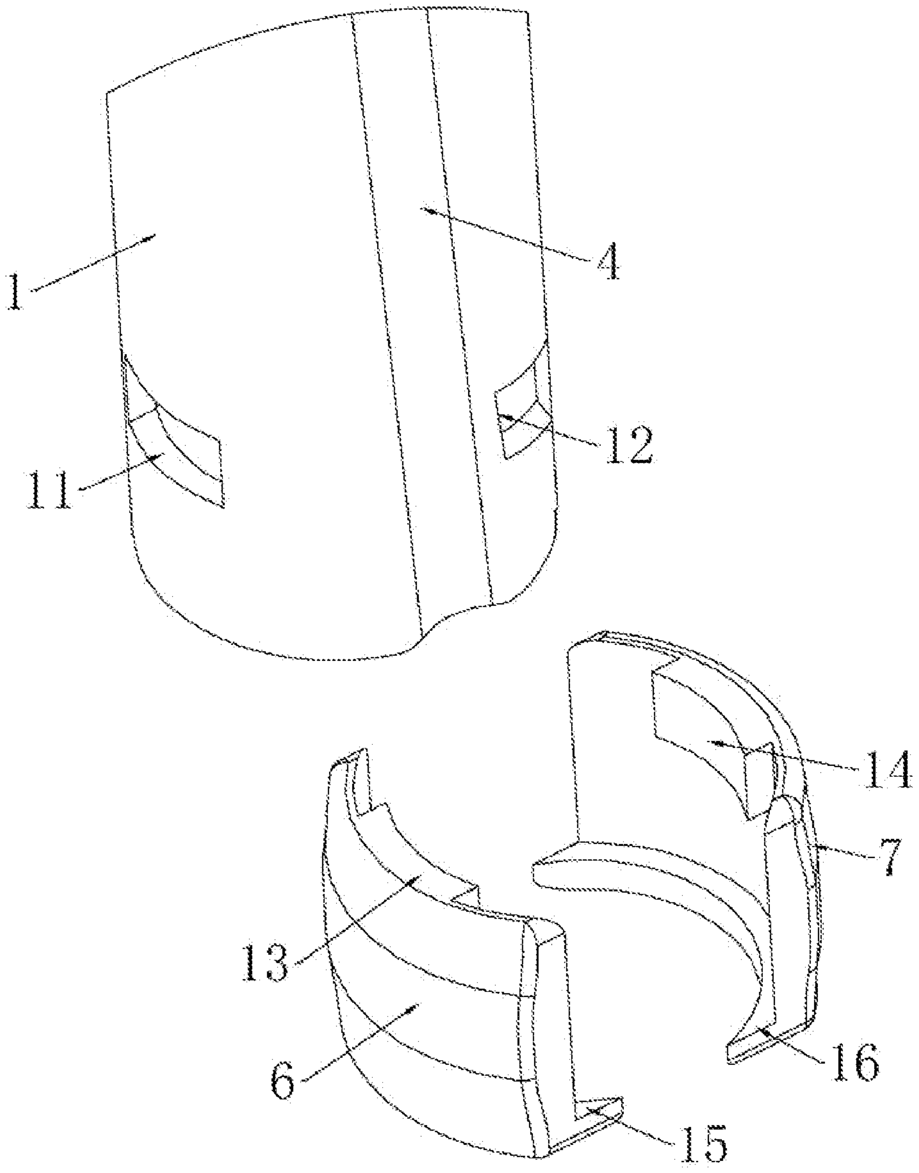
FIG. 4 is the installation schematic view of the first installation block and second installation block.
Figure 5:
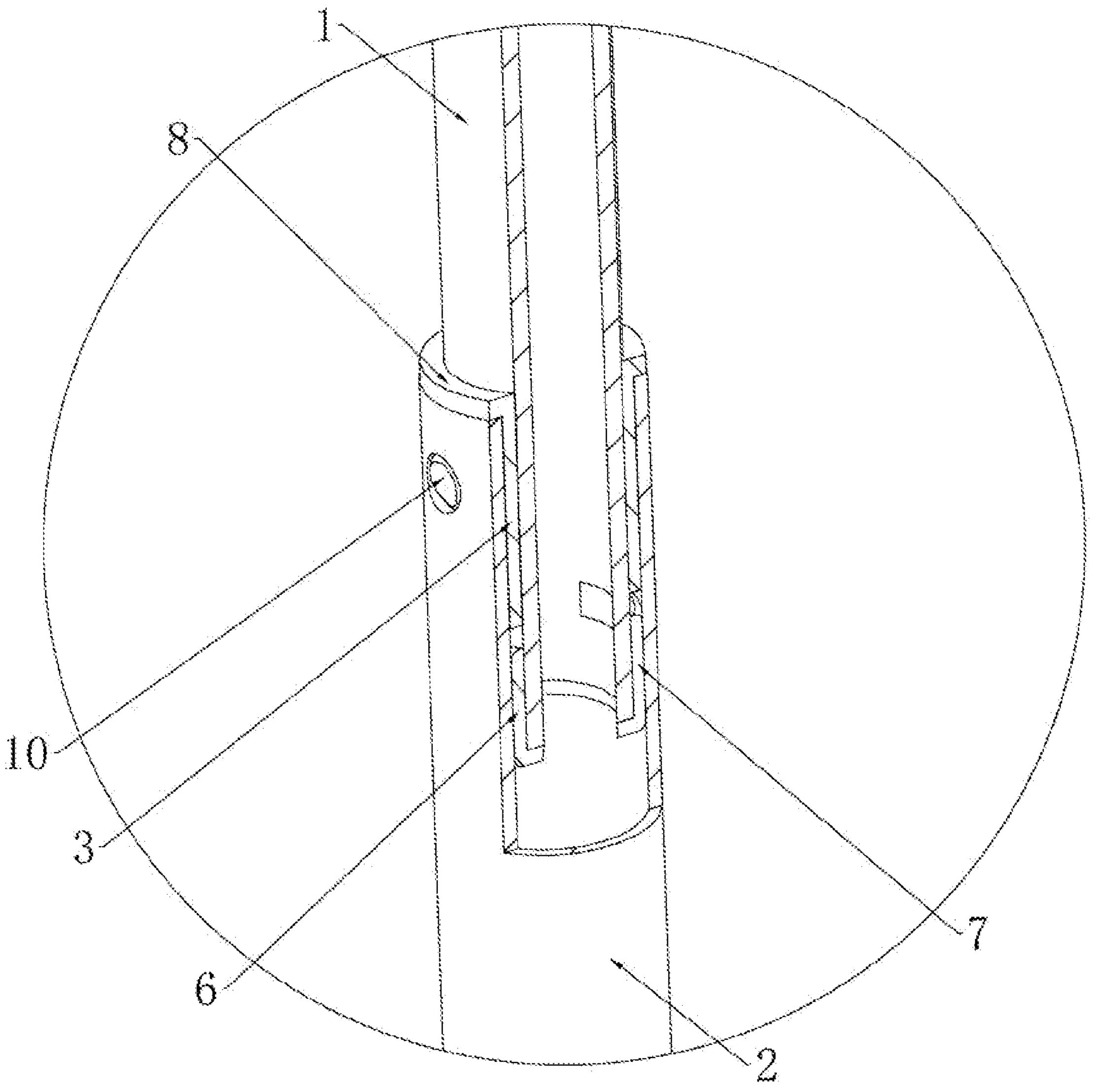
FIG. 5 is the partial sectional schematic view of the positioning rod.

As shown in FIG. 4, the lower end of the moving rod 1 is provided with the first positioning opening 11 and the second positioning opening 12, the first positioning opening 11 and the second positioning opening 12 are symmetrically arranged, the first friction pad 6 is fixedly installed with the first installation block 13 located inside the first positioning opening 11, and the second friction pad 7 is fixedly installed with the second installation block 14 located inside the second positioning opening 12.

As shown in FIG. 4, the first block ring 15 is fixedly installed at the bottom of the first friction pad 6, and the second block ring 16 is fixedly installed at the bottom of the second friction pad 7, the inner diameters of the first block ring 15 and the second block ring 16 are the same as those of the moving rod 1, and the upper end surfaces of the first block ring 15 and the second block ring 16 are in contact with the ground of the moving rod 1.

Figure 2:
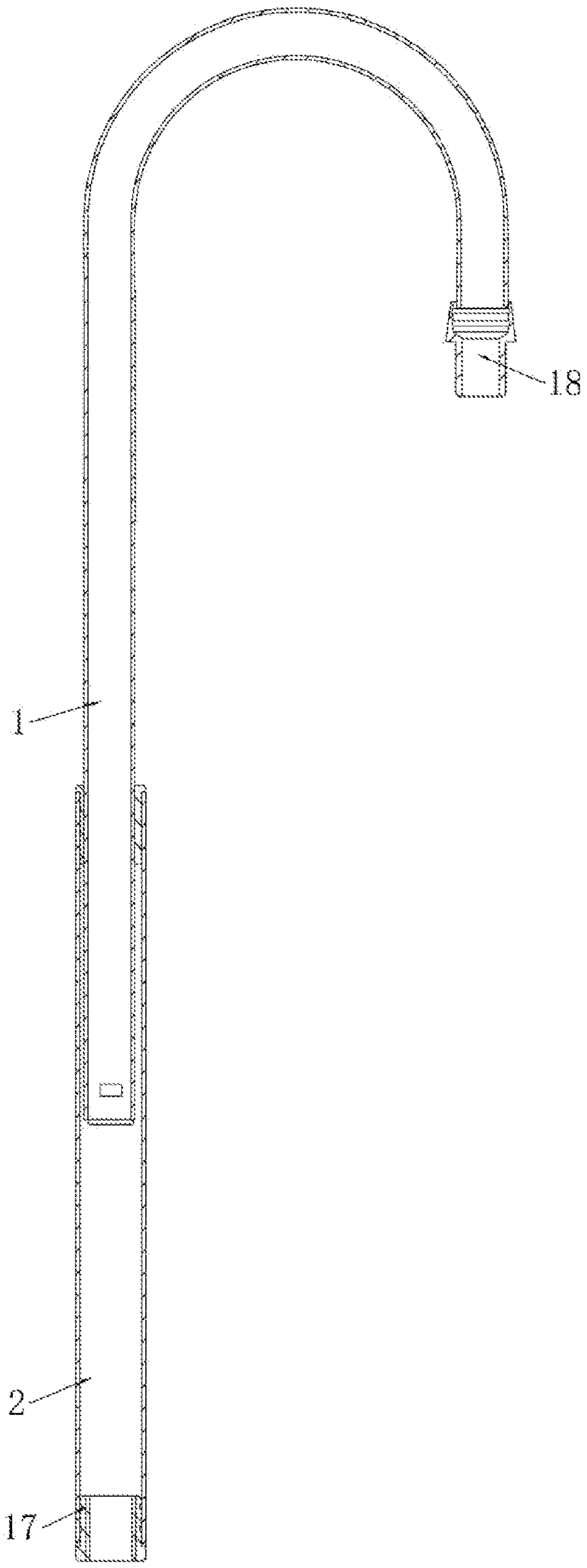
FIG. 2 is the sectional schematic view of FIG. 1.
Figure 3:
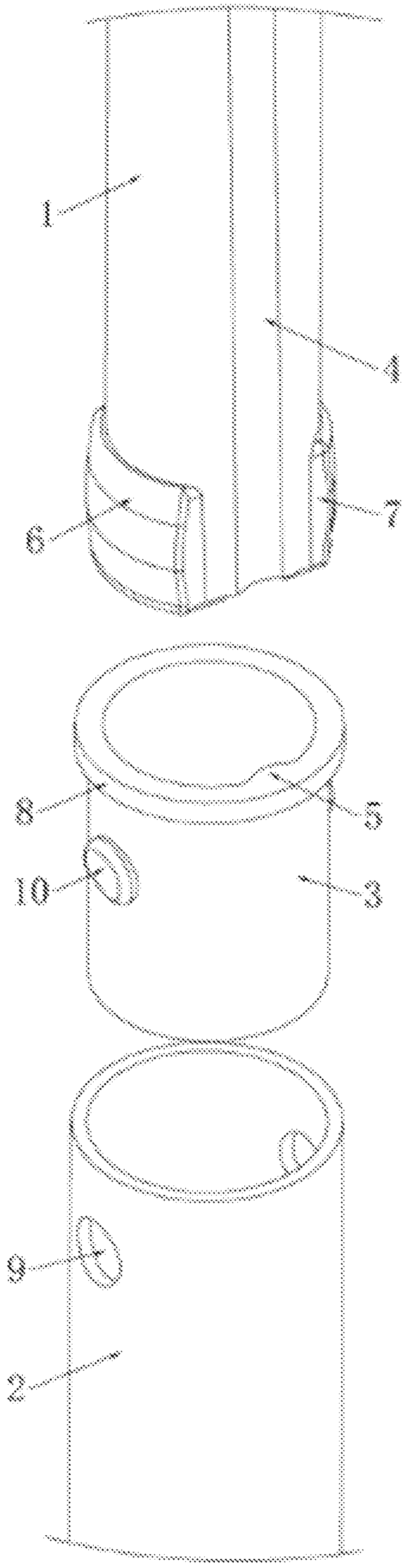
FIG. 3 is the installation schematic view of the first friction pad and second friction pad.

As shown in FIG. 2, the bottom of the positioning rod 2 is internally threaded provided with the installation ring 17, and the upper end of the moving rod 1 is in the curved structure, the upper end of the moving rod 1 is threaded provided with the lamp ring 18, which is used for installing the lamp head, the first friction pad 6 and the second friction pad 7 are in the arc structure, and the outer side surfaces of the first friction pad 6 and the second friction pad 7 are in contact with the inner surface of the positioning rod 2, the first friction pad 6 and the second friction pad 7 are selected as rubber pads or materials with increasing friction, which could increase friction with the inner wall of the positioning rod 2 and achieve automatic positioning.

When assembling the components: firstly fix the installation ring 17 on the lamp holder, then sleeve the limiting cylinder 3 on the moving rod 1, at the same time, the limiting protrusion 5 is positioned within the limiting guide groove 4, so that the first installation block 13 is clamped within the first position opening 11, while the first block ring 15 is in contact with the bottom surface of the moving rod 1, the second installation block 14 is clamped within the second positioning opening 12, and the second block ring 16 is in contact with the bottom surface of the moving rod 1, at this point, the first friction pad 6 and the second friction pad 7 are firmly installed on the moving rod 1. Then, insert the first friction pad 6 and the second friction pad 7 into the positioning rod 2 and insert the lower end of the limiting cylinder 3 into the positioning rod 2. Pinch the corresponding clamping blocks 10 with two fingers, and when the two clamping blocks 10 are compressed, push the limiting cylinder 3 to slide continually into the positioning rod 2, at this point, the outer surfaces of the two clamping blocks 10 is in sliding contact with the inner wall of the positioning rod 2, until the two clamping blocks 10 are connected to the corresponding positioning holes 9, and the fixed installation of the limiting cylinder 3 is completed.

When it is necessary to adjust the height of moving rod 1: firstly pull moving rod 1 up or down, the first friction pad 6 and the second friction pad 7 will slide freely against the inner wall of positioning rod 2. When moving rod 1 is not pulled, due to the large friction force between the first friction pad 6 and the second friction pad 7, the gravity of moving rod 1 itself will not allow the first friction pad 6 and the second friction pad 7 to slide freely. In this way, the first friction pad 6 and the second friction pad 7 could be stopped at any position of the positioning rod 2, and the height of the moving rod 1 could be freely adjusted, making operation more convenient. With the limitation function of the limiting protrusion 5 on the limiting guide groove 4, the moving rod 1 could only slide up and down without free rotation, preventing the lamp from deviating from one side when subjected to external forces and avoiding the cases that affecting normal use.

In the present invention, the use of orientation words such as "upper", "lower", "inside", "outside" are only for the convenience of description, rather than indicating or implying the specific orientation, therefore it should not be construed as being limited to the description of the following embodiments. In addition, it should be noted that the terms "first", "second" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Unless otherwise stated, it should be noted that the terms "installed", "provided" and "connected" should be understood broadly. For example, "connected" could be fixed connection, detachable connection, integral connection, mechanical connection, electrical connection, direct connection, indirect connection through the intermediate structure, or internal connection between two elements. For those of ordinary skill in this field, the specific meanings of the above terms in the present invention can be understood in specific situations.

In the present invention, the terms "including/comprising" and the like in the description and claims of the present invention and the attached drawings are used to describe the technical features, numerical values, steps or components. One or more other features, numerical values, steps, components or their combinations based on this invention shall be included in the scope of protection of the present invention.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. A telescopic rod comprising a moving rod having a limiting guiding groove extending along its outer surface;

first and second friction pads provided on a lower end of the moving rod;

a positioning rod having two positioning holes provided at an upper end; and a limiting cylinder provided with a limiting protrusion on an inner surface, and two clamping blocks extending from the outer surface, the limiting cylinder installed at a top end of the positioning rod with the clamping blocks positioned inside each positioning holes;

wherein the moving rod is slideably installed inside the positioning rod, such that the limiting protrusion is located inside the limiting guide groove, with the first and second friction pad engaging the inside surface of the positioning rod.

2. A telescopic rod according to claim 1, further comprising a stop ring is fixedly installed at the top of the limiting cylinder, with an outer diameter of the stop ring being the same as that of the positioning rod.

3. A telescopic rod according to claim 1, further comprising an internal thread formed in a bottom end of the positioning rod; and an installation ring received in the internal thread.

4. A telescopic rod according to claim 1, further comprising a threaded portion formed at an upper end of the moving rod; and a lamp ring coupled to the threaded portion, wherein the upper end of the moving rod includes a curved portion.

5. A telescopic rod according to claim 1, wherein the first friction pad and the second friction pad are arc-shaped structure.

6. A telescopic rod according to claim 1, further comprising:

a first positioning opening and a second positioning opening located in the lower end of the moving rod;

a first installation block formed in the first friction pad and located inside the first positioning opening and a second installation block formed in the second friction pad and located inside the second positioning opening.

7. A telescopic rod according to claim 6, further comprising:

a first block ring is fixedly installed at the bottom of the first friction pad; and a second block ring is fixedly installed at the bottom of the second friction pad, wherein the inner diameters of the first block ring and the second block ring are the same as that of the moving rod.

* * * * *